(12) United States Patent
Totale

(10) Patent No.: US 10,884,716 B2
(45) Date of Patent: *Jan. 5, 2021

(54) METHOD AND MECHANISM FOR OPTIMAL SCOPE EVALUATION IN SCOPE BASED HIERARCHICAL CONFIGURATION USING EVALUATED SCOPE PROPAGATION TECHNIQUE

(71) Applicant: EMC IP Holding Company LLC, Hopkinton, MA (US)

(72) Inventor: Sachin G. Totale, Pleasanton, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/875,209

(22) Filed: May 15, 2020

(65) Prior Publication Data

US 2020/0278841 A1    Sep. 3, 2020

Related U.S. Application Data

(63) Continuation of application No. 16/040,903, filed on Jul. 20, 2018, now Pat. No. 10,691,425, which is a continuation of application No. 15/077,179, filed on Mar. 22, 2016, now Pat. No. 10,073,682.

(51) Int. Cl.
| | |
|---|---|
| *G06F 8/35* | (2018.01) |
| *G06F 16/22* | (2019.01) |
| *G06F 9/445* | (2018.01) |
| *G06F 8/71* | (2018.01) |

(52) U.S. Cl.
CPC ............ *G06F 8/35* (2013.01); *G06F 16/2246* (2019.01); *G06F 8/71* (2013.01); *G06F 9/44536* (2013.01)

(58) Field of Classification Search
CPC .......... G06F 8/35; G06F 8/71; G06F 16/2246; G06F 9/44536
See application file for complete search history.

(56) References Cited

U.S. PATENT DOCUMENTS

| | | | |
|---|---|---|---|
| 2008/0141230 A1* | 6/2008 | Rowlett | G06F 8/427 717/143 |
| 2013/0317990 A1* | 11/2013 | Heyner | G06F 21/60 705/44 |
| 2015/0019576 A1* | 1/2015 | Seneski | G06F 8/37 707/755 |
| 2017/0075665 A1* | 3/2017 | Koezuka | G06F 11/3466 |

* cited by examiner

*Primary Examiner* — Chat C Do
(74) *Attorney, Agent, or Firm* — Van Pelt, Yi & James LLP

(57) ABSTRACT

A first and second local scope definition associated with a first and second node, respectively, in a hierarchical application tree are received where the hierarchical application tree includes application instructions at one or more nodes within the hierarchical application tree. A pruned version of the hierarchical application tree is determined including by propagating the first local scope definition from the first node to the second node, a child of the first node. Any nodes that are not relevant to a particular set of one or more local scope definitions at a given node are pruned in order to obtain a pruned version of the hierarchical application tree. A qualified application is generated using those application instructions at the unpruned nodes in the pruned version of the hierarchical application tree.

15 Claims, 15 Drawing Sheets

METHOD AND MECHANISM FOR OPTIMAL SCOPE EVALUATION IN SCOPE BASED HIERARCHICAL CONFIGURATION USING EVALUATED SCOPE PROPAGATION TECHNIQUE

CROSS REFERENCE TO OTHER APPLICATIONS

This application is a continuation of co-pending U.S. patent application Ser. No. 16/040,903, entitled METHOD AND MECHANISM FOR OPTIMAL SCOPE EVALUATION IN SCOPE BASED HIERARCHICAL CONFIGURATION USING EVALUATED SCOPE PROPAGATION TECHNIQUE filed Jul. 20, 2018, which is a continuation of U.S. patent application Ser. No. 15/077,179, now U.S. Pat. No. 10,073,682, entitled METHOD AND MECHANISM FOR OPTIMAL SCOPE EVALUATION IN SCOPE BASED HIERARCHICAL CONFIGURATION USING EVALUATED SCOPE PROPAGATION TECHNIQUE filed Mar. 22, 2016, both of which are incorporated herein by reference for all purposes.

BACKGROUND OF THE INVENTION

Some applications, such as business or enterprise applications which follow or otherwise enforce a set of rules or processes that are specific to a particular business, have a variety of configurations. For example, depending upon the role an end user has (e.g., an employee of the business versus an external partner, a manager versus a lower-level employee, etc.), the configuration of the application may be different. For example, different sets of operations or process may be exposed for one role compare to another role. Or, one configuration of the application may be for mobile-based access versus desktop-based access. Although techniques exist for setting scopes and applying them to an application, new techniques would be desirable. For example, it would be desirable if such new scope-related techniques permitted faster and/or less memory-intensive scope evaluation and subsequent generation of a qualified application based on the evaluated scope.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
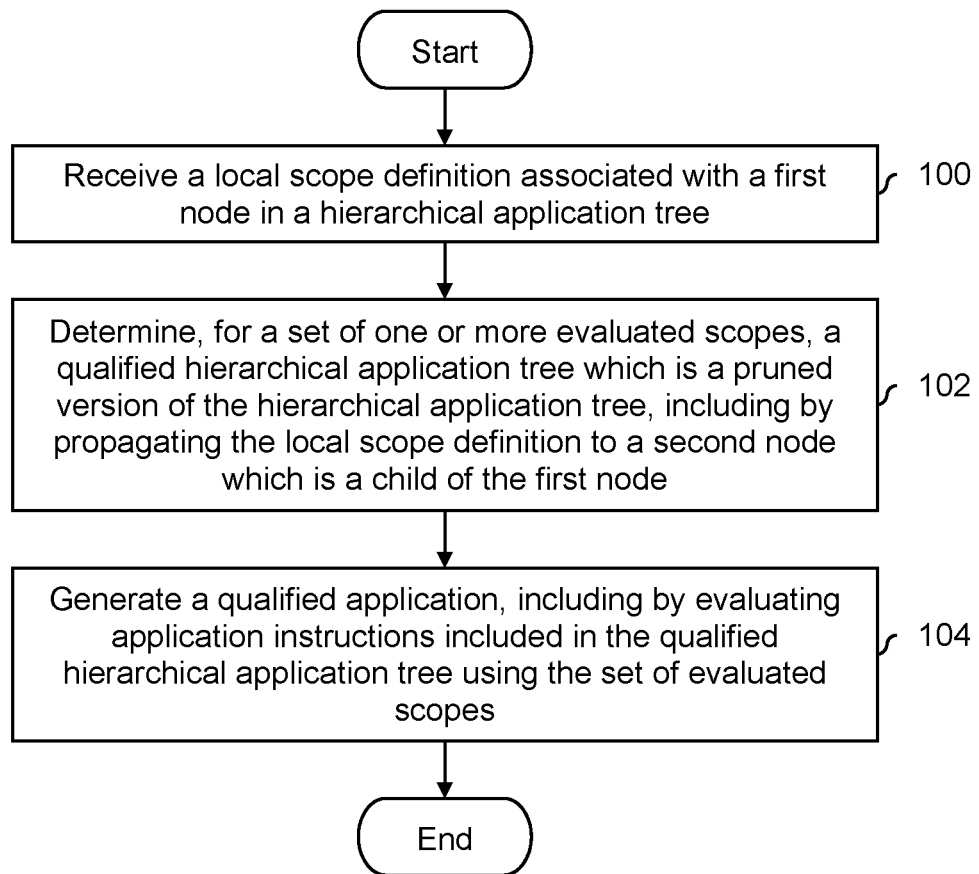
FIG. 1A is flowchart illustrating an embodiment of a process to generate a qualified application using scope propagation.

FIG. 1A is flowchart illustrating an embodiment of a process to generate a qualified application using scope propagation. In the example shown, the process is performed by an application composer. In some embodiments, the application composer is a cloud-based, Software as a Service (SaaS) platform which provides content management centric applications and/or business services. Such a platform may enable a customer to subscribe to one or more applications and/or one or more business services and use those subscriptions to fulfill business objectives. In one such example, the application composer is EMC Horizon. Generally speaking, an application composer is a tool for generating applications, such as a cloud-based application where the data which is accessed and manipulated by the cloud-based application is stored in cloud storage and the cloud-based application is accessed via a web browser.

At 100, a local scope definition associated with a first node in a hierarchical application tree is received. A hierarchical application tree is a tree which includes nodes arranged hierarchically with a single root node at the top of the hierarchy. A node in a hierarchical application tree may be either a file or a directory (e.g., where a directory contains any number of files and/or any number of (other) directories).

All of the application instructions (for convenience, sometimes referred to as code) which describe all of the various configurations and/or features of the application are attached to or otherwise included in the hierarchical application tree at or within some node. To put it another way, there is no code associated with the application which is "floating around" without being attached to (included in) some node in the hierarchical application tree.

In addition to application instructions, local scope definitions are associated with or otherwise included in various nodes of the hierarchical application tree. Not every node is required to have a local scope definition. That is, there may be a node without a local scope definition. Similarly, not every node needs to include application instructions.

The term "local scope definition" refers to any scope(s) that are included in or otherwise associated with a particular node (e.g., a file or a directory) in a hierarchical application tree. A local scope definition is local in the sense that it does not take into account or otherwise reflect other (e.g., higher or lower level) local scope definitions in the hierarchy (e.g., up the hierarchical application tree from a given node to the root node). It is merely the scope(s) that are defined at or otherwise included in a particular node.

At 102, a qualified hierarchical application tree, which is a pruned version of the hierarchical application tree, is determined for a set of one or more evaluated scopes, including by propagating the local scope definition to a second node which is a child of the first node. For example, if a child node has no local scope definition, then the local scope definition from the parent is applied or otherwise propagated. Generally speaking, scopes are propagated down a hierarchical application tree (e.g., unless a particular type of scope is narrowed by some lower-level local scope definition as will be described in more detail later).

As used herein, the term "evaluated scope" is associated with the scope(s) corresponding to a particular qualified hierarchical application tree (e.g., after all decision making about what nodes/branches to include has completed). For example, a qualified hierarchical application tree includes all of the nodes (and thus, all of the corresponding application instructions) which have all of the scope definitions included in a particular set of evaluated scopes.

In some embodiments, there are multiple types of scope which are independent of each other. In one example of step 102, suppose the local scope definition associated with the first/parent node is associated with a first type of scope (e.g., X, where X is A or B) and the local scope definition associated with the second/child node is associated with a second, orthogonal type of scope (e.g., Y, where Y is 0 or 1). Since the two types of scope are orthogonal to each other, the scope of the second/child node would inherit both scopes (e.g., X is A or B and Y is 0 or 1).

In another example of step 102, suppose the scope associated with the first/parent node defines a certain scope (e.g., X is A or B) and the local scope definition associated with the second/child node narrows that scope further (e.g., X is A). In that example, the scope associated with the second node would be narrowed by the local scope definition and would therefore be X is A.

In some embodiments, once a scope is defined (e.g., for a particular type of scope), the scope cannot be broadened, it can only remain the same or be narrowed (e.g., going down that branch, away from the root node). For example, suppose the scope at some node is that X has a value of A or B. The scope as one goes further down that branch can only remain the same (e.g., X is A or B) or narrow (e.g., X is A) but cannot be broadened (e.g., X is A, B, or C).

In some embodiments, multiple qualified hierarchical application tree are generated at step 102 (e.g., for all possible combinations of evaluated scopes). For example, this may be done ahead of time (e.g., before an end user logs in to a web-based application). Alternatively, in some embodiments, a single qualified hierarchical application tree is generated at step 102 (e.g., on-the-fly and/or in response to an end user logging in to a web-based application).

At 104, a qualified application is generated, including by evaluating application instructions included in the qualified hierarchical application tree using the set of evaluated scopes. A qualified application is qualified in the sense that it is applicable to and/or relevant to one or more particular scopes. For example, if the scope is a device scope, then one qualified application may be a mobile version of an application and another qualified application may be a version of an application which is accessed from a desktop computer.

As described above, various pieces of application instructions are included in various nodes throughout the hierarchical application tree. Conceptually, the process of FIG. 1A reduces some code base (e.g., for all versions, variations, or scopes), first by pruning nodes or branches which are not relevant for a particular set of evaluated scopes at step 102 in order to obtain a pruned or reduced version of the hierarchical application tree. Then, at step 104, the application instructions in the qualified hierarchical application tree may be further reduced by evaluating any if/then/else statements, switch statements, or case statements with the set of evaluated scopes (e.g., associated with that particular qualified hierarchical application tree).

In one example, an evaluated scope includes a device scope which describes a device from which the application is accessed from. For example, if the device scope is mobile, then the qualified application which results from FIG. 1A might correspond to a mobile version of the application. Or, if the device scope is set to desktop, then qualified application which results might correspond to a desktop version of the application. Typically, a desktop or laptop computer has additional or greater resources beyond that offered by a mobile device (e.g., a larger screen, more processing power, more storage, more power (i.e., no battery), etc.). Naturally, it would be desirable to change the user experience with the application based on whether the device scope is mobile versus desktop. For example, processor-intensive graphics may be turned off and/or less processor-intensive graphics may be used. In some other examples, the layout or arrangement of elements may be different to accommodate smaller screens and/or some application tools or tasks which are unlikely and/or unwieldy to access from a mobile device may be disabled or otherwise made inaccessible. Thus, depending on whether the device scope is set to desktop versus mobile, different application instructions are included or used.

In another example, the evaluated scope includes a role associated with a particular (end) user. For example, the application may be used in an enterprise or business context where different (end) users have different responsibilities and/or privileges (e.g., creating, sharing, editing, reviewing, approving, and/or commenting on a variety of documents or other data). Depending upon the particular role an end user has, different versions of the application are presented, for example with different responsibilities, privileges, and/or tasks. Two example roles are creator and reviewer. In one example, when the scope is set to creator, the ability to create and delete documents is made accessible to that end user. In contrast, when the scope is set to reviewer, the ability to create and delete documents in the application is not may be made accessible to that end user because reviewers are not permitted to create or delete documents (e.g., they are only permitted to read the document and add comments and/or markups to the document).

In another example, the role scope may be platform admin (e.g., a developer or programmer associated with the application composition tool) or tenant admin (e.g., a developer or programmer associated with the business which built an application specific to its business flow or practices using the application composition tool). For example, it may be desirable to expose debugging tools when a role is platform admin or tenant admin, but the platform admin may additionally have access to even more developer tools (e.g., access to the libraries of the application composer, access to the code of the application composer itself, etc.).

In another example, the evaluated scope includes an object scope which defines the scope of features or properties associated with a data object (e.g., which can be created, modified, or deleted by an end user of the application). For example, suppose there is a data object associated with stock keeping units (SKUs). SKUs are implemented in a variety of ways and the application may support a variety of SKUs, each with a different set of features, properties, or fields. Some example SKU scope values includes basic and expanded. Naturally, the SKU scope will affect how certain tasks or operations in the application are performed. For example, to use the exemplary SKU scope values described above, a create SKU operation will create either a basic SKU data object or an expanded SKU data object depending upon the SKU scope value.

In some embodiments, generating a qualified application at step 104 includes stripping out or otherwise discarding application instructions which are not relevant (e.g., to the evaluated scope for that node). For example, if the qualified application is passed to some web browser which runs the qualified application (e.g., because the application is a web-based or web-accessible application), then irrelevant application instructions are not passed to the web browser and/or loaded into memory. This may be desirable from a performance point of view because network resources and/or memory are conserved.

In some embodiments, the qualified application is a web-based application. For example, step 104 may include generating an application executable which is then served to a web browser (e.g., on the user's device). The web browser loads the executable and initiates the user interaction per the instructions received along with the executables. On every user interaction, the application executable running in the web browser performs further rule qualifications and changes the application behavior per the outcome of the rule qualification.

In some embodiments, the qualified application is generated at step 104 ahead of time (e.g., before an end user logs in). Alternatively, the qualified application may be generated on-the-fly and/or in response to a user logging in to the application.

The following figure illustrates an example of FIG. 1A where a qualified application is generated in response to and/or for a specific user. For example, an end user may login to the application with some user account such that some role scope (e.g., author, reviewer, tenant admin, or platform admin) is known for that particular user account. It is therefore known that the qualified application should be generated for a particular role scope. Or, the application detects that the application is being accessed from a mobile device (e.g., as opposed to a desktop device). In that example, it would be known that a qualified application should be generated for mobile access (i.e., the access context is that the device scope is mobile).

Figure 1B:
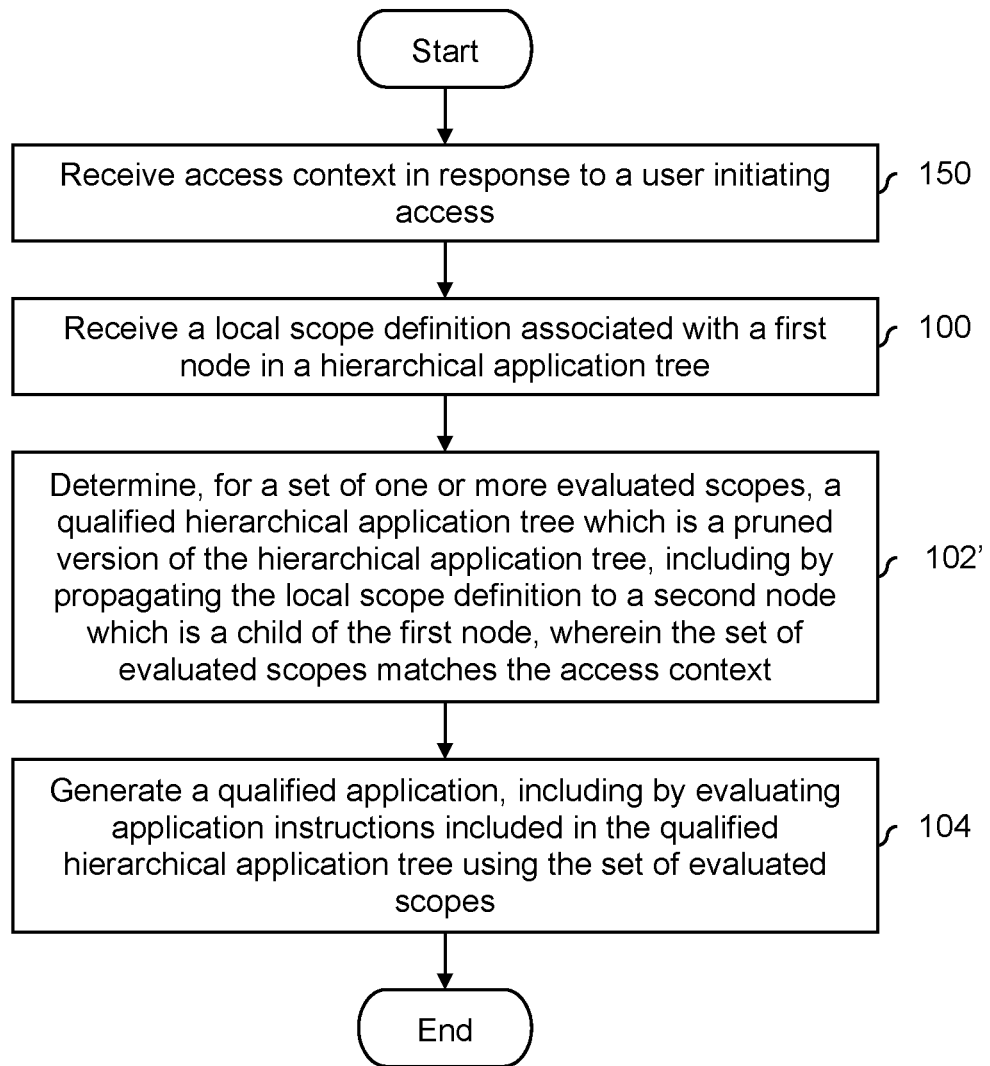
FIG. 1B is flowchart illustrating an embodiment of a process to generate a qualified application for a specific access context.

FIG. 1B is flowchart illustrating an embodiment of a process to generate a qualified application for a specific access context. For convenience, steps that are the same or similar to those in FIG. 1A use the same or similar numbering.

At 150, access context is received in response to a user initiating access. In some examples described in more detail below, access context includes a role (e.g., determined based on the login information), a subscription plan (e.g., determined based on the login information), and/or an access device (e.g., whether the user is accessing the application through a mobile device or a desktop device). Generally speaking, the qualified application which is generated according to this process is appropriate for the access context.

At 100, a local scope definition associated with a first node in a hierarchical application tree is received. For example, the process traverses the hierarchical application tree and some scope definition is included in or otherwise associated with the exemplary first node.

At 102', a qualified hierarchical application tree, which is a pruned version of the hierarchical application tree, is determined for a set of one or more evaluated scopes, including by propagating the local scope definition to a second node which is a child of the first node, wherein the set of evaluated scopes matches the access context. To put it another way, the qualified hierarchical application tree is pruned in a manner that is appropriate for the access context. For example, nodes or branches which contain application instructions for business processes which that particular user is not permitted to access may be pruned from the qualified hierarchical application tree.

At 104, a qualified application is generated, including by evaluating application instructions included in the qualified hierarchical application tree using the set of evaluated scopes. For example, if based on the access context, the access device is a mobile device, the qualified application would correspond to a mobile version of the application. Or, if the access context indicates the end user has a particular role, then the qualified application generated at step 104 only permits that end user to access business processes appropriate for that role.

The following figures illustrate an example where access to various business processes depends upon a role and/or a subscription plan.

Figure 2:
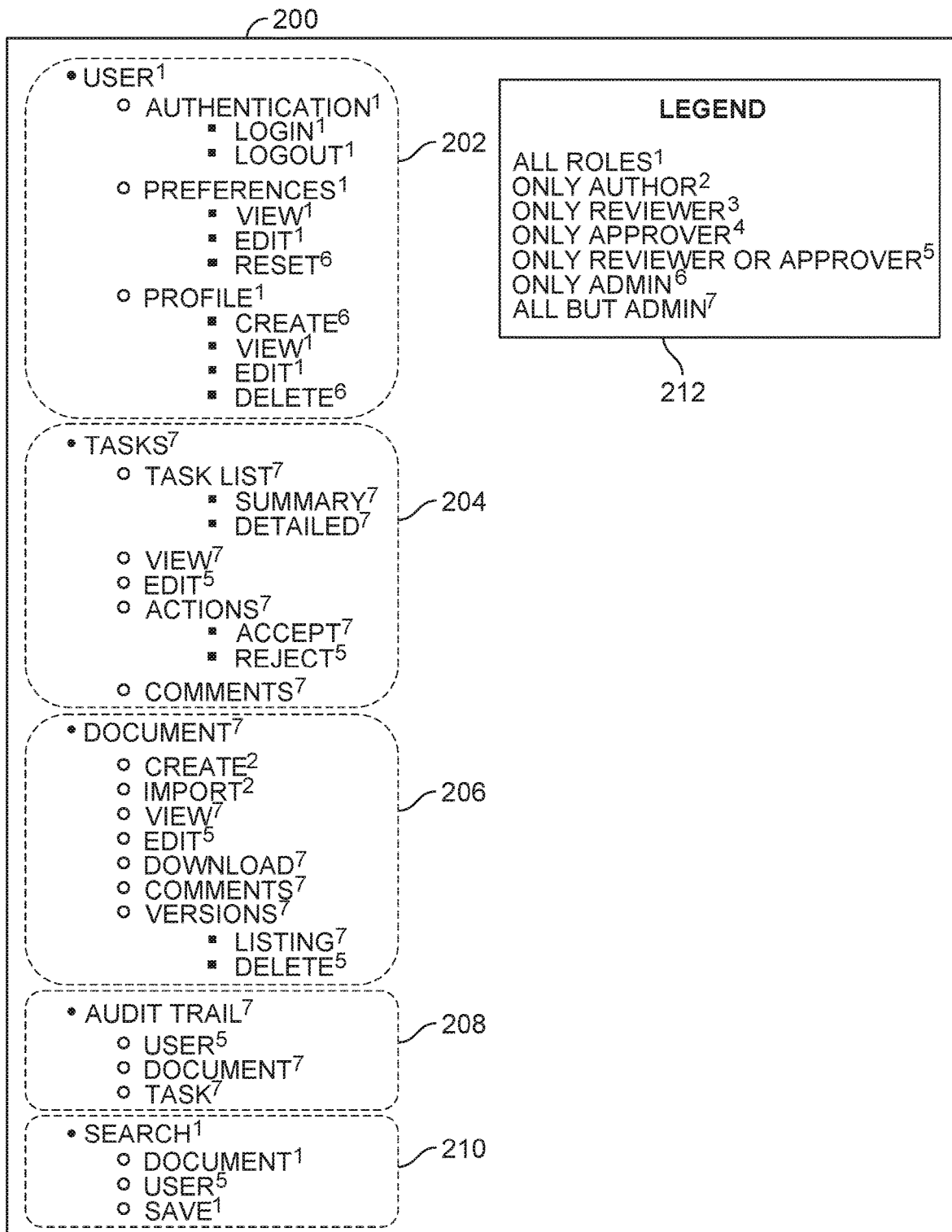
FIG. 2 is a diagram illustrating an embodiment of access rules for business processes based on the role of an end user.

FIG. 2 is a diagram illustrating an embodiment of access rules for business processes based on the role of an end user. In this example, diagram 200 shows processes or operations associated with a document task management business application.

In this example, the processes shown are grouped with other, similar processes. For example, user group 202 shows user-related processes including authentication related processes, processes associated with user preferences (e.g., viewing, editing, and resetting a use preference), and processes associated with user profiles (e.g., creating, viewing, editing, and deleting a user profile). Other groups include task group 204 (e.g., associated with creating and assigning tasks or action items amongst end users), document group 206 (e.g., associated with documents related processes such as creating, editing, deleting, downloading, commenting, etc.), audit trail group 208 (e.g., associated with following or tracking a document and/or a user, either after the fact or while the action is occurring), and search group 210 (e.g., associated with search related processes).

In one example, an end user logs in to the document task management application (e.g., at some URL since this example application is a web-based application) and from the login information a role associated with the end user is known. In examples described herein there are four possible roles: author, reviewer, approver, and admin. The application can have more than one author associated with a particular reviewer and similarly an approver can approve documents from multiple teams/authors. Depending on a user's role(s), the user is permitted to access and perform various business processes in the application.

Legend 212 shows the color codes and superscript numbering associated with each role. For example, the document versions delete process is associated only with the reviewer and approver role. As such, an end user with a role of author or admin would not be able to perform the document versions delete process (e.g., because it is not exposed or otherwise made accessible to the end user).

In addition to making certain processes available to an end user depending upon role, the document task management application makes certain processes available to an end user depending upon a subscription plan (in this example at least). Generally speaking, end users with a basic subscription have access to some processes, end users with a silver subscription have access to even more processes, and end users with a gold subscription have access to all processes (at least in this example). The following figure shows the same processes shown in FIG. 2, but with access based on subscription plan.

Figure 3:
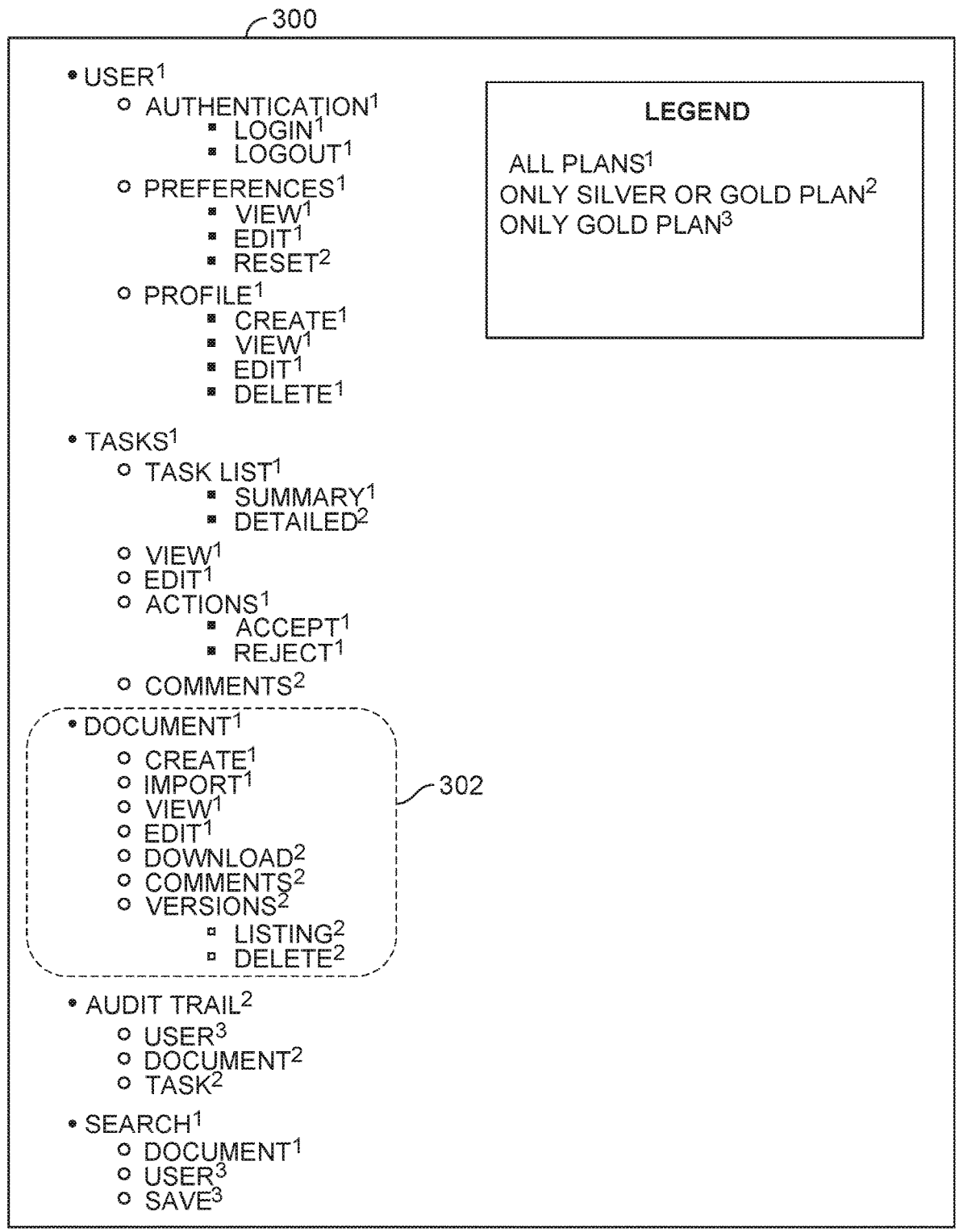
FIG. 3 is a diagram illustrating an embodiment of access rules for business processes based on subscription plan.

FIG. 3 is a diagram illustrating an embodiment of access rules for business processes based on subscription plan. For example, a small business with only a few employees may have a basic subscription plan, a mid-sized business may have a silver subscription plan, and a large business may have a gold subscription plan.

As shown in this example, some business processes are only accessible to end users with at least a silver plan such as being able to reset user preferences, a detailed task list, task comments, document download, document comments, document version-related processes (listing and deleting document versions), performing an audit trail on a document, and performing an audit trail on a task.

In this example, performing an audit trail on a user, searching based on user, and saving a search are processes that are only accessible to end users with a gold subscription.

The following figures show which business processes would be accessible to exemplary end users having a certain role and a certain subscription plan. In addition, the type of device being used to access the application is also described which in turn may affect the application.

Figure 4:
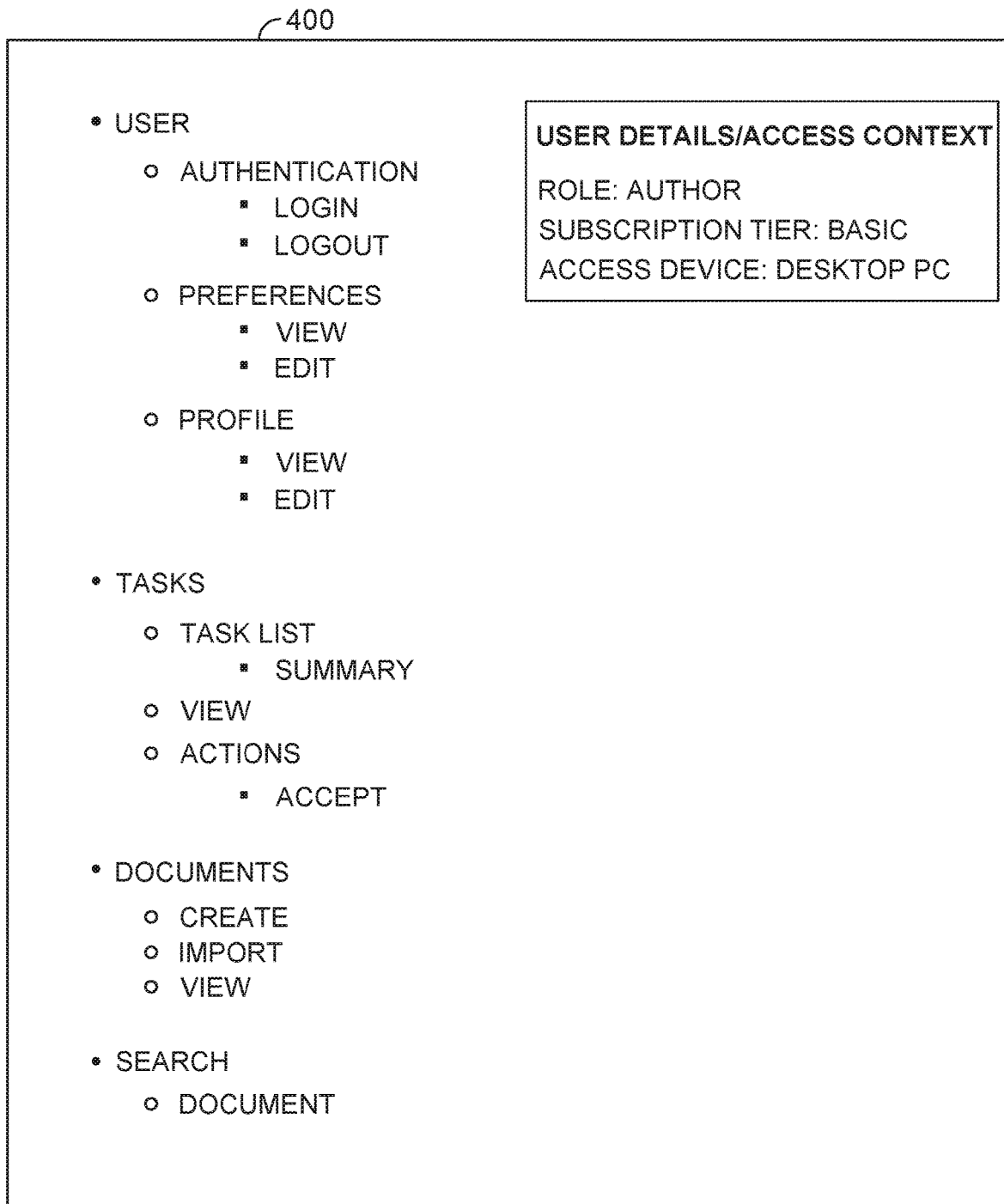
FIG. 4 is a diagram illustrating an embodiment of accessible business processes for an author with a basic subscription plan.

FIG. 4 is a diagram illustrating an embodiment of accessible business processes for an author with a basic subscription plan. In this example, diagram 400 shows which business processes would be made accessible to an end user having a role of author and with a basic subscription plan based on the access rules shown in FIG. 2 and FIG. 3.

Figure 5:
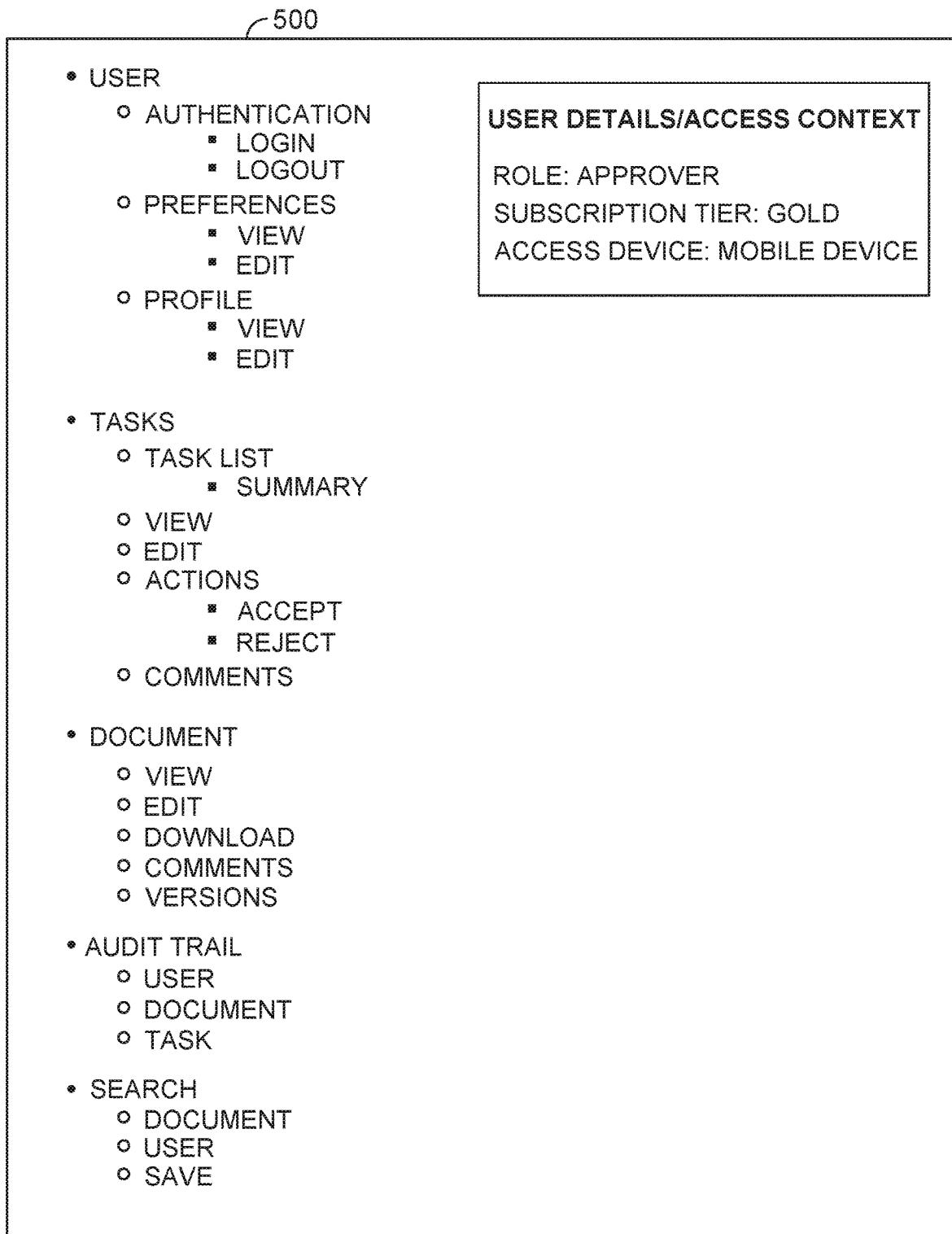
FIG. 5 is a diagram illustrating an embodiment of accessible business processes for an approver with a gold subscription plan.

FIG. 5 is a diagram illustrating an embodiment of accessible business processes for an approver with a gold subscription plan. In this example, diagram 500 shows which business processes would be made accessible to an end user having a role of approver and with a gold subscription plan based on the access rules shown in FIG. 2 and FIG. 3.

In the example of FIG. 5, the end user is accessing the application from a mobile device (e.g., as opposed to a desktop PC, as was the case in FIG. 4). Given that the exemplary application can either be accessed from a mobile device or a desktop device, the user interface which is presented to the user is adjusted. Although this is not explicitly shown in FIG. 4 or FIG. 5, in some embodiments, page layout is varied (e.g., based on the user device, the page layout and content displayed on the page are changed in order to accommodate smaller screens and devices with less processing, storage, and/or power resources), page navigation is varied (e.g., based on the user device, the user navigation is adjusted), and/or available functionalities are varied (e.g., on smaller-screen devices with fewer resources such as mobile devices, some of the application functionalities are not made available for the end user either because the display is too large or the functionality would consume too many resources). For example, application instructions within the qualified hierarchical application tree may be evaluated using the evaluated scopes and some code may be unselected or unused as the result of some if/then/else statement, some switch statement, or some case statement.

The following figures show a partial hierarchical application tree (including local scope definitions) in more detail and which is used to enforce the access rules shown in FIG. 2 and FIG. 3.

Figure 6:
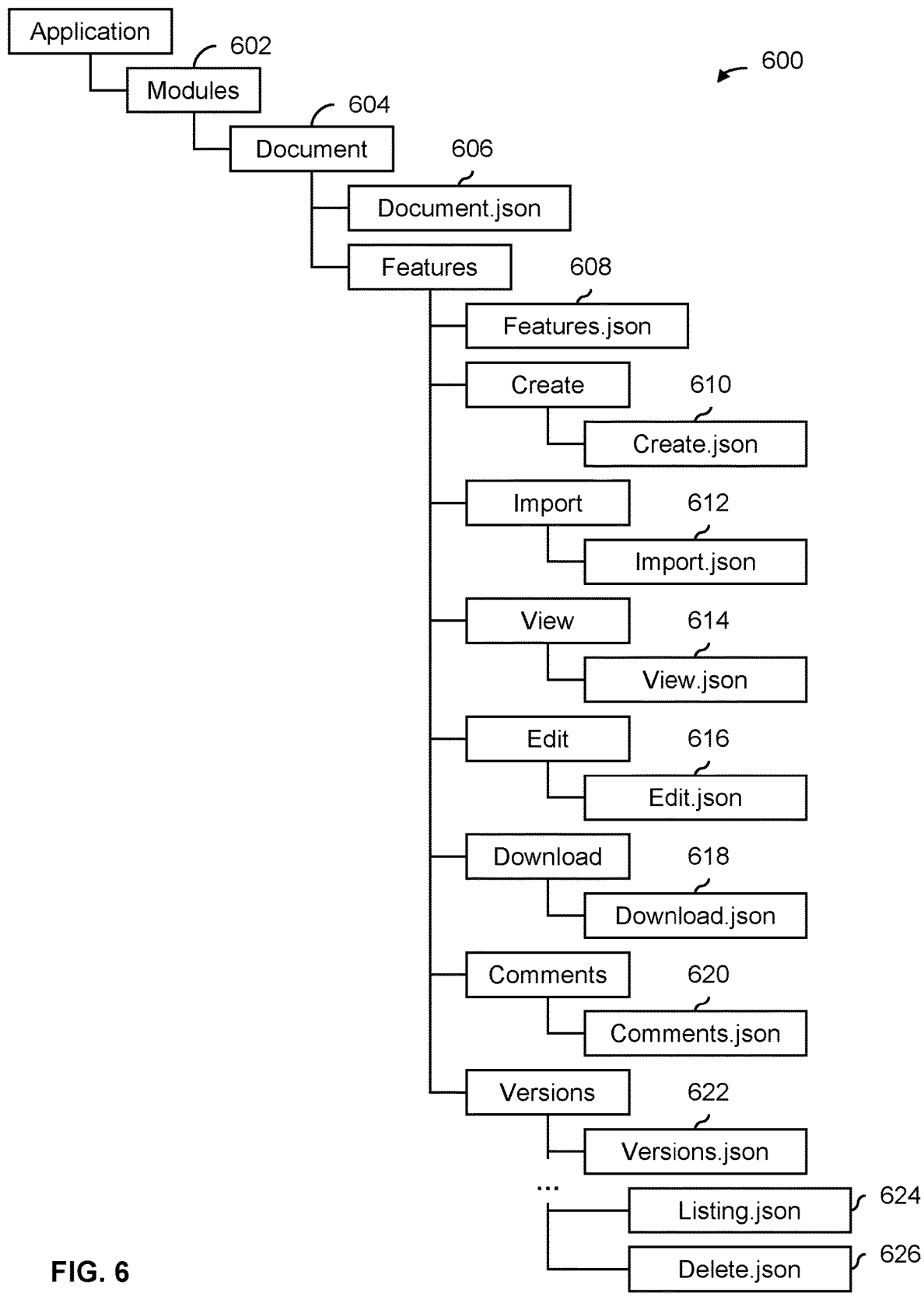
FIG. 6 is a diagram illustrating an embodiment of a partial hierarchical application tree.

FIG. 6 is a diagram illustrating an embodiment of a partial hierarchical application tree. In this example, the structure of the complete hierarchical application tree (not shown) is similar to the grouping/hierarchy shown in FIG. 2 and FIG. 3. For example, modules directory (602) may also include directories called user, tasks, audit, and search for code or instructions relating to (respectively) user-related processes, task-related processes, audit-related processes, and search related processes. See, for example, the groups other than the document group shown in FIG. 2 and FIG. 3. To preserve readability, this example focuses on the document directory/branch and other branches/nodes are not shown or described.

The contents of the document.json file (606) are:

```
{
    "id": "colombo.modules.document",
    "Description": "This is the document module for colombo",
    "$scope" : {
        "roles":["author", "reviewer", "approver"]
    }
}
```

In this example, the local scope definition defines the scope to be role=author, reviewer, or approver. The node which is associated with this local scope definition is document node 604 (see the id definition). In this example, once a scope is defined (e.g., for a particular type of scope, in this case role), the scope cannot be broadened, it can only remain the same or be narrowed down a branch that includes that particular node. To put it another way, since document.json file 606 defines the role scope as author, reviewer, or approver at document node 604, none of the document-related processes which are located below document node 604 (i.e., create, import, view, edit, download, comments, or the two versions process: listing and delete) can have a role scope of admin since this would broaden the scope of role.

The contents of the features.json file (608) are:

```
{
    "id": "colombo.modules.document.features",
    "Description": "This is the document module features configuration"
}
```

It is noted that there is no local scope definition here associated with the features node. Therefore, the scope from document.json 606 is inherited at the features node.

The contents of the create.json file (610) are:

```
{
    "id": "colombo.modules.document.features.create",
    "Description": "This is the document create feature",
    "$scope": {
        "roles":["author"]
    }
}
```

It is noted that the local scope definition here (i.e., at the create node) narrows the role scope to just author. Note that in FIG. 2, the document create process is accessible only to authors.

The contents of the import.json file (612) are:

```
{
    "id": "colombo.modules.document.features.import",
    "Description": "This is the document import feature",
    "$scope" : {
        "roles":["author"]
    }
}
```

It is noted that the local scope definition here narrows the role scope to just author at the import node. Note that in FIG. 2, the document import process is accessible only to authors.

The contents of the view.json file (614) are:

```
{
    "id": "colombo.modules.document.features.view",
    "Description": "This is the document view feature"
}
```

Note that in FIG. 2, the document view process is accessible authors, reviewer, and approvers (i.e., all but admin) and so the local scope definition from above (i.e., in the document.json file) is appropriate and/or proper. As such, there is no local scope definition here for the document view process.

The contents of the edit.json file (616) are:

```
{
    "id": "colombo.modules.document.features.edit",
    "Description": "This is the document edit properties feature",
    "$scope" : {
        "roles":["reviewer", "approver"]
    }
}
```

The local scope definition here narrows the role scope to (just) reviewers and approvers. Note that in FIG. 2, the document edit process is accessible only to reviewers and approvers.

The contents of the download.json file (618) are:

```
{
    "id": "colombo.modules.document.features.download",
    "Description": "This is the document download feature",
    "$scope": {
        "subscriptionTier": ["silver", "gold"]
    }
}
```

The local scope definition here introduces a scope type of subscriptionTier, which was not previously defined or otherwise encountered (i.e., above the download node in the hierarchy). The subscription tier is set to silver or gold; note that in FIG. 3, the document download process is only accessible to end users with a gold or silver subscription.

The contents of the comments.json file (620) are:

```
{
    "id": "colombo.modules.document.features.comments",
    "Description": "This is the document comments feature",
    "$scope": {
        "subscriptionTier": ["sliver", "gold"]
    }
}
```

As above, the document comments process is only accessible to end users with a gold or silver subscription and the local scope definition in comments.json file (620) enforces that access rule. See FIG. 3.

The contents of the versions.json file (622) are:

```
{
    "id": "colombo.modules.document.features.versions",
    "Description": "This is the document versions feature",
    "$scope": {
        "subscriptionTier": ["silver", "gold"]
    }
}
```

As above, in FIG. 3, the document comments process is only accessible to end users with a gold or silver subscription.

The contents of the listing.json file (624) are listed below. Due to space limitations, the entire path of the listing.json file is not shown. The portion of the path which is not shown (beginning from the versions directory) is versions/operations/listing/listing.json.

```
{
    "id": "colombo.modules.document.features.versions.operations.list",
    "Description": "This is the document versions listing operation"
}
```

It is noted that there is no local scope definition here, so the scope for the document features versions node is inherited from above (e.g., from features.json file 608 and versions.json file 622).

The following shows the contents of the delete.json file (626). Due to space limitations, the entire path of the delete.json file is not shown. The portion of the path which is not shown (beginning from the versions directory) is versions/operations/delete/delete.json.

```
{
    "id":
    "colombo.modules.document.features.versions.operations.delete"
    "Description": "This is the document versions delete operation",
    "$scope" : {
        "roles":["reviewer", "approver"]
    }
}
```

In this case, the role scope is defined to be reviewer or approver, narrowing the scope from all but admin (i.e., author, reviewer, or approver). Note that in FIG. 2, the document versions delete process is only available to end users who are either a reviewer or an approver.

Returning to FIG. 1A, in some embodiments, at step 104, multiple qualified hierarchical application tree are simultaneously generated. For example, this may be an efficient way to generate all qualified hierarchical application tree for all possible combinations of scope (e.g., without re-tracing or re-traversing upper-level portions of the full hierarchical application tree). The following figures show some examples of this for document-related processes and the corresponding document branch of an exemplary hierarchical application tree.

Figure 7A:
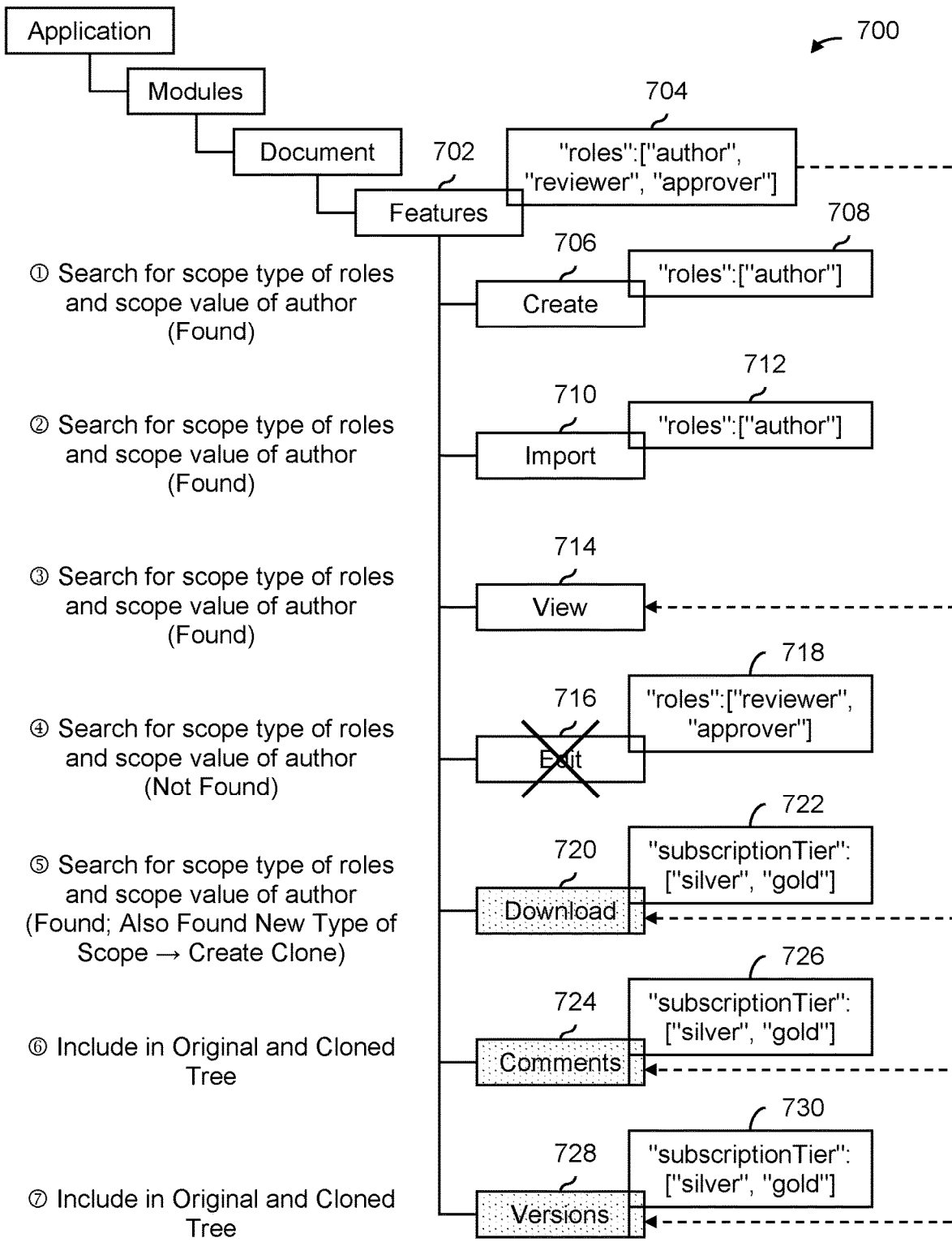
FIG. 7A is a diagram illustrating an embodiment of a partial hierarchical application tree with local scope definitions used to create a cloned hierarchical application tree for an author with a silver or gold subscription plan.

FIG. 7A is a diagram illustrating an embodiment of a partial hierarchical application tree with local scope definitions used to create a cloned hierarchical application tree for an author with a silver or gold subscription plan. FIG. 7A is similar to FIG. 6, except the .json files (which include local scope definitions for those nodes which have a local scope definiation) are not shown. Rather, the local scope definitions (if any) are shown with their respective nodes. Also, for simplicity and readability, the nodes below the versions node (e.g., the listing and delete directories and corresponding son files) are not shown in diagram 700.

The steps shown in this figure illustrate an example of step 102 in FIG. 1A. In this example, the process begins by searching for nodes with a scope type of roles and a scope value of author. The process begins at create node 706. Note that local scope definition 708 narrows roles to just author. The scope of roles=author is found and create node 706 is included in the qualified hierarchical application tree being constructed (not shown).

Next, import node 710 is evaluated and it also has a scope of roles=author. As such, the import node is included in the qualified hierarchical application tree that is being constructed (not shown).

At view node 714, there is no local scope definition associated with that node. As such, the scopes from local scope definition 704 (associated with features node 702, which is the parent of view node 714) are propagated downward. As a result of this propagation, view node 714 has a scope of roles=author, reviewer, or approver. Since this includes roles=author, view node 714 is included in the qualified hierarchical application tree being built.

At edit node 716, local scope definition 718 narrows the roles scope to just reviewer or approver. Since the values do not include the value of author (which is the value being searched for), edit node 716 is excluded from the qualified hierarchical application tree being built.

At download node 720, since the roles scope defined in local scope definition 704 is independent of and/or orthogonal to the subscriptionTier scope defined in local scope definition 722, the roles scope defined in local scope definition 704 is propagated down to download node 720. Download node 720 therefore includes a scope of roles=author, reviewer, or approver (propagated down from local scope definition 704) and is included in the qualified hierarchical application tree being built.

Furthermore, because download node 720 includes a new type of scope which has not been encountered before (i.e., subscriptionTier), a cloned hierarchical application tree is created. The cloned hierarchical application tree has an evaluated scope which includes both the new type of scope and the old type of scope (i.e., roles=author and subscriptionTier=silver or gold in this example). It is noted that the cloned hierarchical application tree is a qualified application tree in its own right and may be used to generate a qualified application at step 104 in FIG. 1A or FIG. 1B.

The act of creating a clone does not change the qualified hierarchical application tree which was already being generated (associated with just roles=author). That is, the previously processed nodes which (up to this point) have been included in the qualified hierarchical application tree being constructed (i.e., create node 706, import node 710, and view node 714, but not edit node 716) remain in the qualified hierarchical application tree. This tree is sometimes referred to as the original qualified hierarchical application tree and the corresponding evaluated scope only includes the old scope (i.e., roles=author in this example) and does not include the new type of scope (i.e., subscriptionTier).

In contrast, since this is the first time the subscriptionTier scope is being encountered, none of the nodes already processed or otherwise encountered are included in the cloned tree (e.g., otherwise the subscriptionTier type of scope would have already been encountered). So in this example, create node 706, import node 710, view node 714, and edit node 716 are not included in the cloned hierarchical application tree. Download node 720 is included in the cloned hierarchical application tree because it has a scope of roles=author in addition to subscriptionTier=silver or gold.

The process then evaluates comments node 724 and its scopes. Like download node 720, it inherits a scope of roles=author, reviewer, or approver from local scope definition 704 and it also has its own local scope definition (726) which gives it a scope of subscriptionTier=silver or gold. As a result of these scopes, comments node 724 is included in both the original qualified hierarchical application tree and the cloned hierarchical application tree.

Similarly, versions node 728 is evaluated and for the same reasons described above would be included in both trees. Although not shown in this figure, the process would go to the next level in the hierarchy into the versions directory and use similar decision making on the versions listing node and versions delete node (not shown or described here). Naturally, if the versions directory were not included in one or both of the trees, then the subsequent processing would skip those nodes (since once a parent node is excluded from a tree being built, child nodes of that excluded node are likewise ignored or skipped).

As is shown in this example, one benefit to the technique described herein is that duplicate work can be avoided. For example, the creation of the cloned tree at download node 720 eliminates the need to duplicate all of the decision making associated with create node 706—edit node 716, as well as any decision making associated with higher hierarchy levels. To put it another way, all of the decision making does not need to be performed again in order to get the cloned hierarchical application tree.

In this example, the ordering of nodes 706-728 follows the ordering from the previous figures for consistency and clarity. In some embodiments, nodes in a directory are presorted before processing at step 102 in FIG. 1A or step 102' in FIG. 1B. In one example, all nodes in a directory being processed are sorted first so that nodes which only contain old scope types are processed first. Any nodes associated with new scope types (i.e., which have not been observed before) then follow. Further refinement may also be performed. For example, if there are multiple new scope types, then the nodes may be sorted so that all nodes with a first new scope type are processed first, then all nodes with a second new scope type are processed subsequently.

In this example, a local scope definition precludes any of that scope from being associated with sibling nodes and children of such sibling nodes. For example, since local scope definition 704 (associated with features node 704) includes a scope of roles=author, reviewer, or approver, any siblings of features 702 (not shown) and its children cannot have a scope of author, reviewer, or approver. To put it another way, once a particular scope is defined in a local scope definition that defined scope is exclusive to that branch. It is noted that a sibling node could have a local scope definition which includes the same scope type but with some other value.

The following figures show the hierarchical application trees which result from the processing shown here.

Figure 7B:
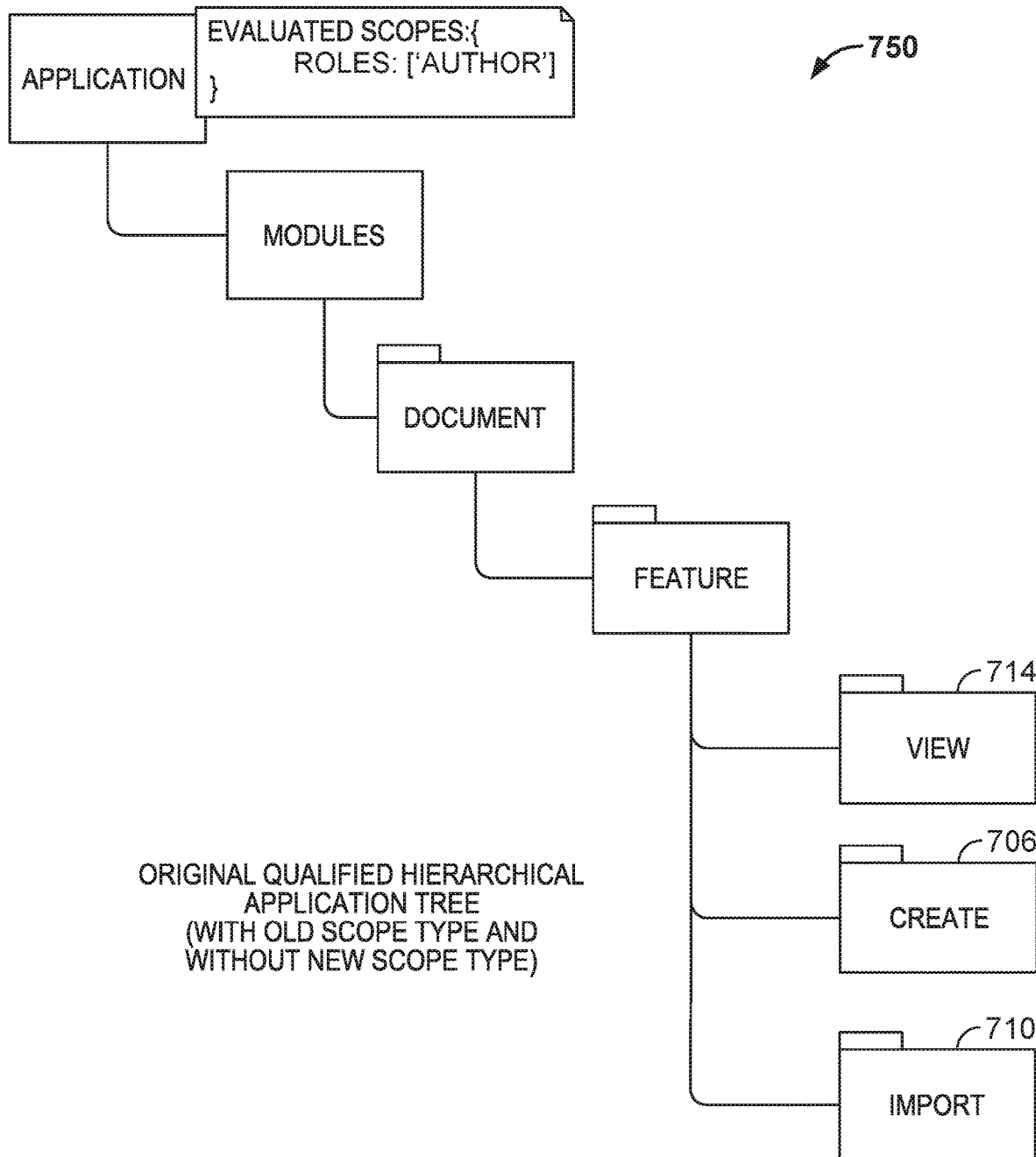
FIG. 7B is a diagram illustrating an embodiment of an original qualified hierarchical application tree associated with an evaluated scope of a role of author.

FIG. 7B is a diagram illustrating an embodiment of an original qualified hierarchical application tree associated with an evaluated scope of a role of author. (It is noted that the ordering of view node 714, create node 706, and import node 710 has changed from FIG. 7A, but that does not substantially or meaningfully change the tree or example described.) In this example, original qualified hierarchical application tree 750 is associated with an evaluated scope of roles=author. It is not associated with subscriptionTier=silver or gold. As a result, nodes which include application instructions for processes which require a silver or gold subscription are excluded from original qualified hierarchical application tree 750. Then, if/when original qualified hierarchical application tree 750 is used to generate a qualified application, the resulting application will not have any instructions for processes which require a silver or gold subscription. This prevents an unauthorized end user from having access to those restricted processes.

Similarly, the edit process is restricted to end users with a role of reviewer or approver. Since original qualified hierarchical application tree 750 corresponds to an evaluated scope of roles=author, the edit node (and its application instructions) are excluded from original qualified hierarchical application tree 750.

In one example of how original qualified hierarchical application tree 750 fit into FIG. 1A/1B, original qualified hierarchical application tree 750 is an example of a qualified hierarchical application tree which is generated at step 102 in FIG. 1A or step 102' in FIG. 1B. Original qualified hierarchical application tree 750 may be used to generate a qualified application at step 104 in FIG. 1A or 1B for an end user with a role scope of author (i.e., which matches the evaluated scope shown here).

Figure 7C:
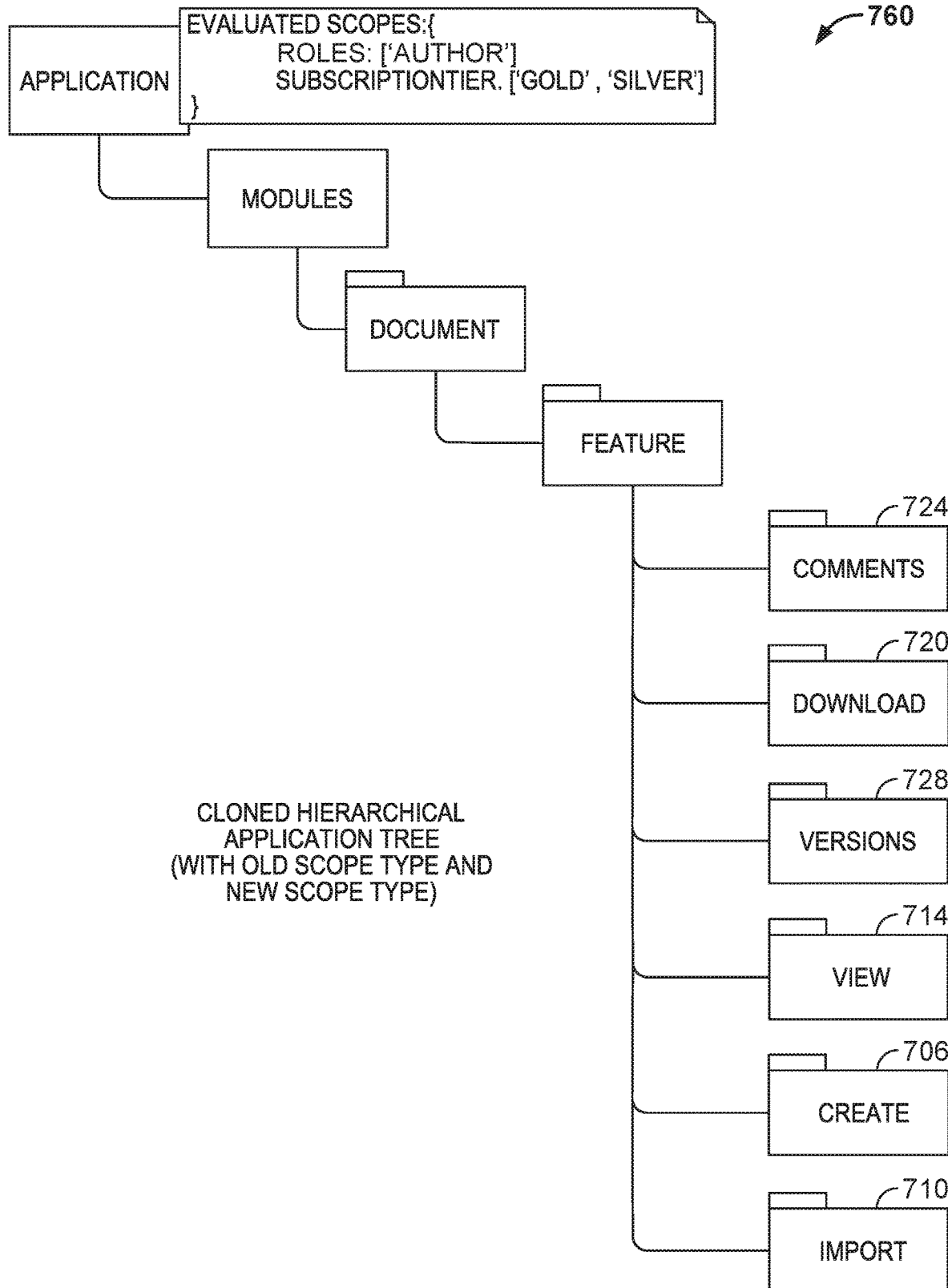
FIG. 7C is a diagram illustrating an embodiment of a cloned hierarchical application tree associated with an evaluated scope of a role of author and a subscription plan of silver or gold.

FIG. 7C is a diagram illustrating an embodiment of a cloned hierarchical application tree associated with an evaluated scope of a role of author and a subscription plan of silver or gold. As before, any change in the ordering of nodes from any previous figure is not substantive. Unlike original qualified hierarchical application tree 750 in FIG. 7B, cloned hierarchical application tree 760 includes comments node 724, download node 720, and versions node 728. This is because the evaluated scope for this figure includes a subscriptionTier scope of silver or gold and the comments, download, and versions processes are only accessible to end users with a silver or gold subscription. The inclusion of comments node 724, download node 720, and versions node 728 in hierarchical application tree 760 is indicated by the highlighting of those directories.

With cloned hierarchical application tree 760 (which as described above is a qualified hierarchical application tree in its own right), a qualified application may be generated for an end user with a role of author and a silver or a gold subscription. Since comments node 724, download node 720, and versions node 728 are included in cloned hierarchical application tree 760, the associated application instructions which implement those processes would be included in the resulting qualified application and made available to an end user (with a role of author and a silver or a gold subscription).

Next, the process, including cloning, is repeated for a role of reviewer or approver.

Figure 8A:
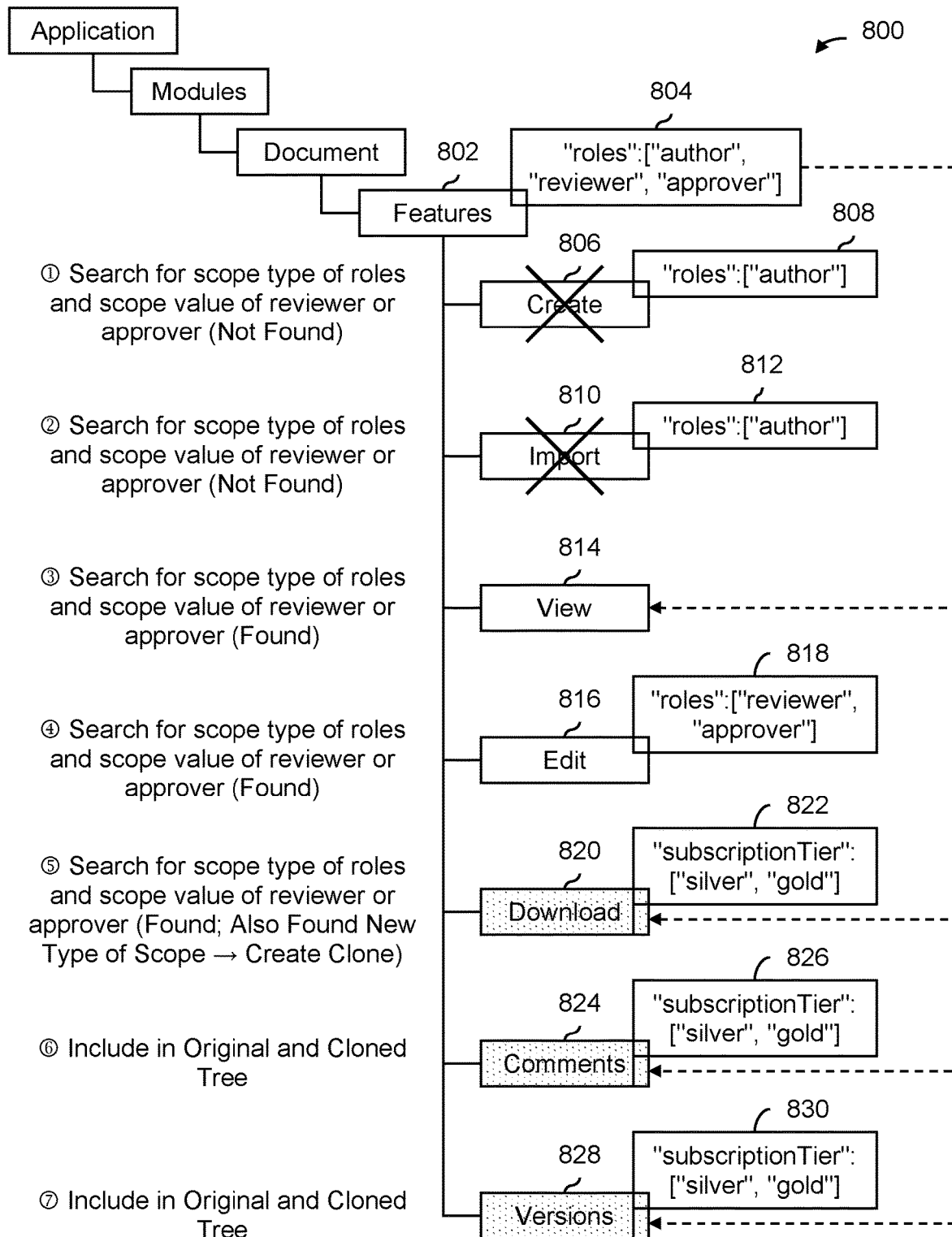
FIG. 8A is a diagram illustrating an embodiment of a partial hierarchical application tree with local scope definitions used to create a cloned hierarchical application tree for a reviewer or approver with a silver or gold subscription plan.

FIG. 8A is a diagram illustrating an embodiment of a partial hierarchical application tree with local scope definitions used to create a cloned hierarchical application tree for a reviewer or approver with a silver or gold subscription plan. As before, the example process begins at create node 806. Local scope definition 808 narrows the roles scope to author and the process is looking for a roles value of reviewer or approver. Since the values do not match those being searched for, create node 806 is excluded from the qualified hierarchical application tree being built (not shown).

Next, import node 810 is evaluated. It also has a local scope definition (812) which also narrows the roles scope to author. Since import node 810 does not have a scope value of reviewer or approver, import node 810 is excluded from the qualified hierarchical application tree being built.

View node 814 does not have a local scope definition associated with it and thus inherits the scopes from local scope definition 804, which is associated with its parent, features node 802. View node 814 therefore does have a value of reviewer or author for the roles scope type and is included in the qualified hierarchical application tree being built.

Edit node 816 has local scope definition 818 associated with it which narrows the roles to reviewer or approver.

Since those are the scope values being searched for, edit node 816 is included in the qualified hierarchical application tree being built.

At download node 820, local scope definition 822 does not narrow the scope of the roles scope type and therefore download node 820 inherits a scope of roles=author, reviewer, or approver from local scope definition 804. Download node 820 therefore includes the scope values of reviewer or approver which the process is looking for and download node 820 is included in the qualified hierarchical application tree being built.

In addition, download node 820 has a new type of scope (i.e., subscriptionTier) which has not been encountered before (at least in this pass with for roles=reviewer or approver). This new scope type causes the process to create a cloned hierarchical application tree. The cloned hierarchical application tree will include download node 820, but not any of the other nodes which were previously included in the qualified hierarchical application tree being built (i.e., view node 814 and edit node 816). This is because those previously encountered nodes were not associated with the scope of subscriptionTier (otherwise that scope type would not be new).

Next, comments node 824 is evaluated. From local scope definition 804, comments node 824 inherits a scope of roles=author, reviewer, or approver. Comments node 824 is therefore included in the original qualified hierarchical application tree because it includes the scope roles=reviewer or author. From local scope definition 826, comments node 824 has a scope of subscriptionTier=silver or gold (e.g., in addition to roles=author, reviewer, or approver). As a result, comments node 824 is also included in the cloned hierarchical application tree being built.

Next, versions node 828 is evaluated. The decision making for that node is the same as that for comments node 824 and therefore versions node 828 is included both in the original qualified hierarchical application tree and the cloned hierarchical application tree being built.

As described above, the process may then go down to the next level in the hierarchy and evaluate the versions listing and versions delete nodes in versions directory 828 (not shown or described here).

The following figures show the hierarchical application trees which result from the processing shown here.

Figure 8B:
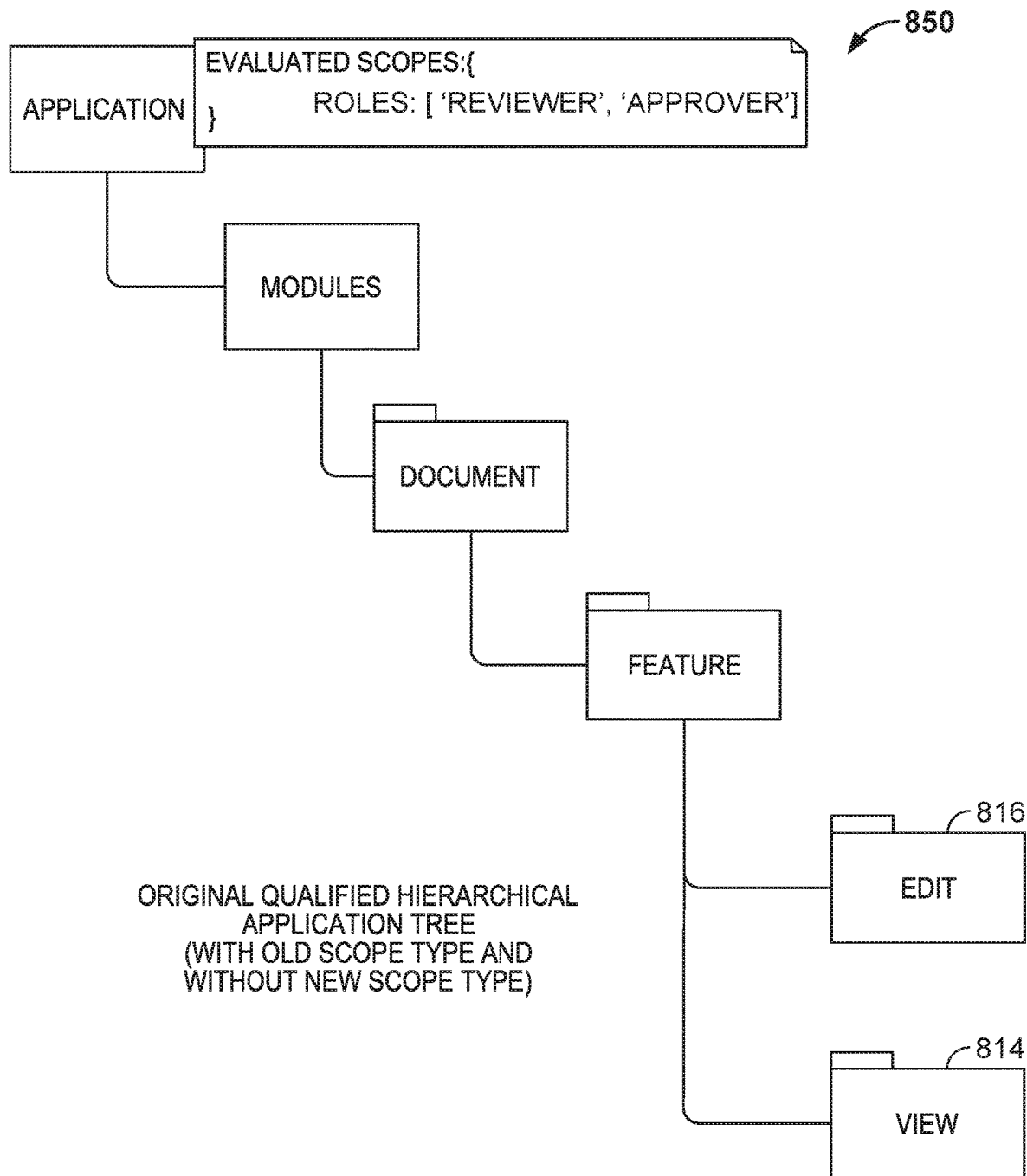
FIG. 8B is a diagram illustrating an embodiment of an original qualified hierarchical application tree associated with an evaluated scope of a role of reviewer or approver.

FIG. 8B is a diagram illustrating an embodiment of an original qualified hierarchical application tree associated with an evaluated scope of a role of reviewer or approver. Per the decision making described above, original qualified hierarchical application tree 850 includes edit node 816 and view node 814. For example, because the evaluated scope associated with original qualified hierarchical application tree 850 is (just) roles=reviewer or approver (i.e., without subscriptionTier=silver or gold). Without a silver or gold subscription, a corresponding end user is not permitted to access the download, comments, and versions process (see, e.g., FIG. 3).

Figure 8C:
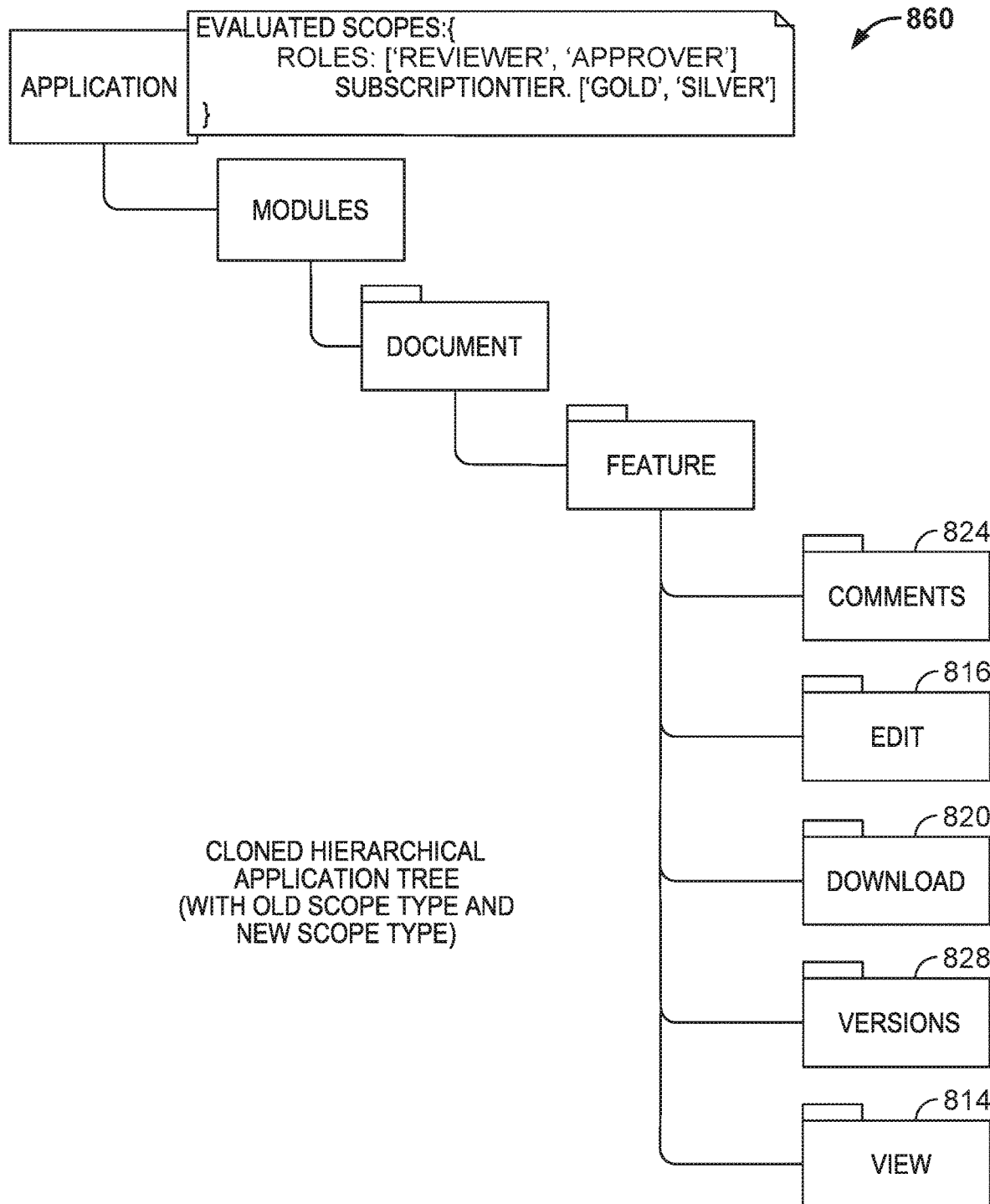
FIG. 8C is a diagram illustrating an embodiment of a cloned hierarchical application tree associated with an evaluated scope of a role of reviewer or approver and a subscription plan of silver or gold.

FIG. 8C is a diagram illustrating an embodiment of a cloned hierarchical application tree associated with an evaluated scope of a role of reviewer or approver and a subscription plan of silver or gold. Per the decision making described above, cloned hierarchical application tree 860 includes commends node 824, edit node 816, download node 820, versions node 828, and view node 814. The evaluated scope associated with this tree is roles=reviewer or approver and subscriptionTier=silver or gold, so a corresponding end user would have access to the download, comments, and versions process in addition to the edit and view processes (see, e.g., FIG. 2 and FIG. 3). The addition of commends node 824, edit download node 820, and versions node 828 in cloned hierarchical application tree 860 (in comparison to original qualified hierarchical application tree 850 from FIG. 8B) is illustrated by the highlighting of those nodes.

The following figures describe some of the decision making shown above more formally.

Figure 9:
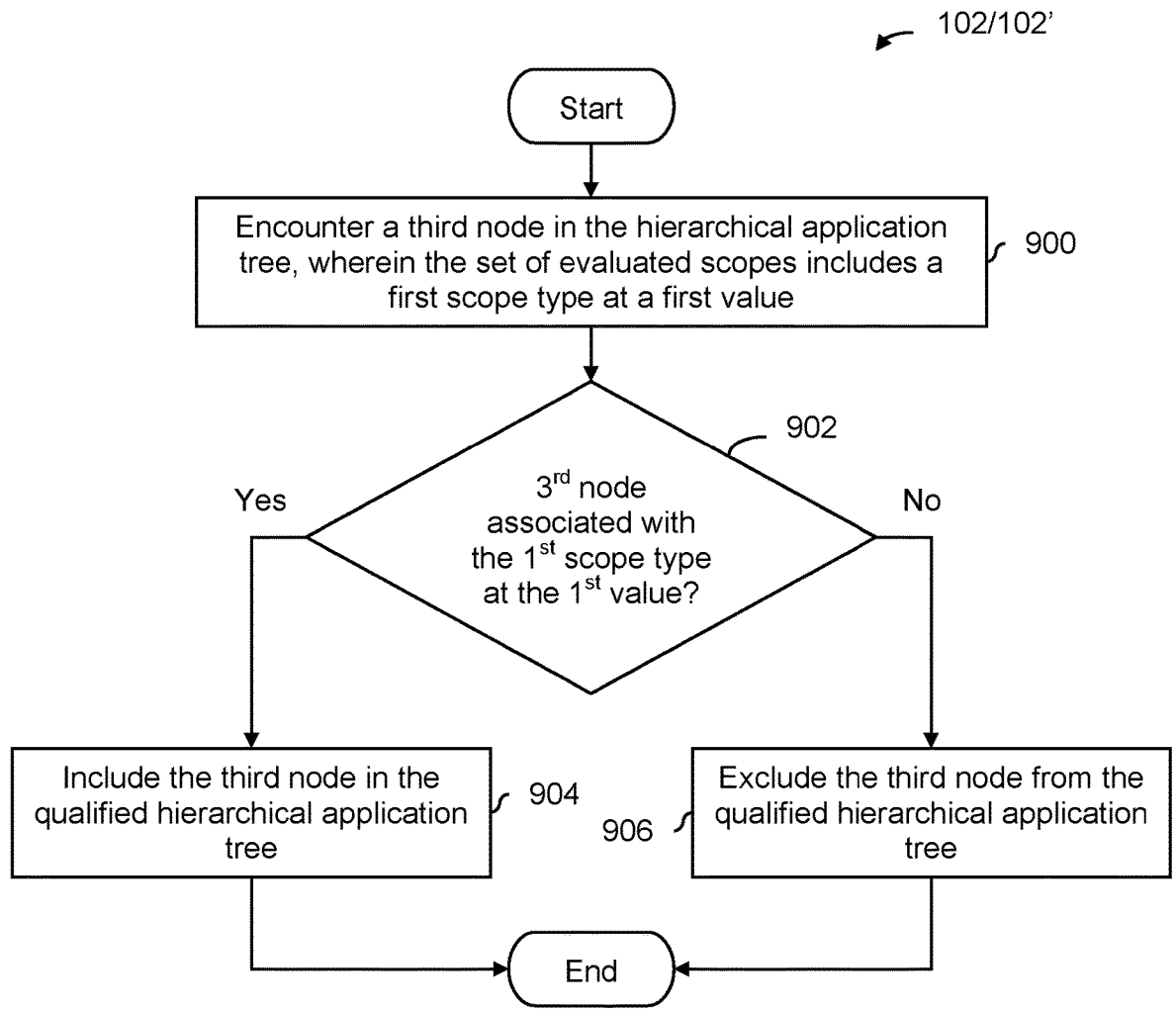
FIG. 9 is a flowchart illustrating an embodiment of a process to decide whether to include a node in a qualified hierarchical application tree.

FIG. 9 is a flowchart illustrating an embodiment of a process to decide whether to include a node in a qualified hierarchical application tree. In some embodiments, FIG. 9 is used at step 102 in FIG. 1A or at step 102' in FIG. 1B.

At 900, a third node is encountered in the hierarchical application tree, wherein the set of evaluated scopes includes a first scope type at a first value. For example, the set of evaluated scopes is/are the scope(s) corresponding to or for which a particular qualified hierarchical application tree is being generated.

At 902, it is determined whether the third node is associated with the first scope type at the first value. If so, the third node is included in the qualified hierarchical application tree at 904. See, for example, create node 706 in FIG. 7A and FIG. 7B and view node 814 in FIG. 8A and FIG. 8B.

If not, the third node is excluded from the qualified hierarchical application tree at 906. See, for example, edit node 716 in FIG. 7A and FIG. 7B and create node 806 in FIG. 8A and FIG. 8B.

Figure 10:
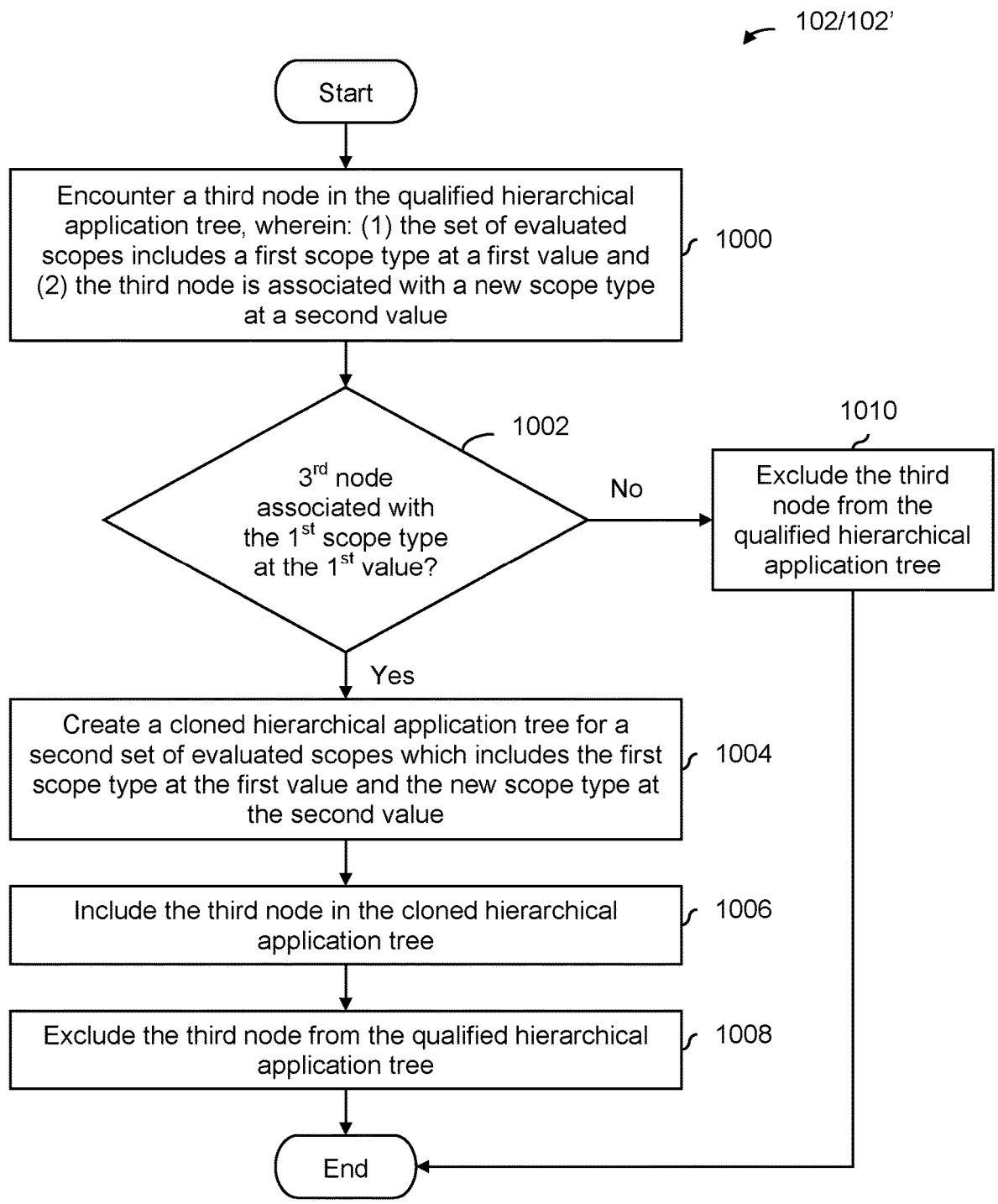
FIG. 10 is a flowchart illustrating an embodiment of a process to decide whether to create a cloned hierarchical application tree.

FIG. 10 is a flowchart illustrating an embodiment of a process to decide whether to create a cloned hierarchical application tree. In some embodiments, FIG. 10 is used at step 102 in FIG. 1A or at step 102' in FIG. 1B.

At 1000, a third node in the qualified hierarchical application tree is encountered, wherein: (1) the set of evaluated scopes includes a first scope type at a first value and (2) the third node is associated with a new scope type at a second value.

At 1002, it is determined whether the third node is associated with the first scope type at the first value. If so, at 1004, a cloned hierarchical application tree is created for a second set of evaluated scopes which includes the first scope type at the first value and the new scope type at the second value. The third node is then included in the cloned hierarchical application tree at 1006. See, for example, download node 720 (820) which caused a cloned hierarchical application tree to be created in FIG. 7A (8A) and which is included in cloned hierarchical application tree 760 (860) in FIG. 7C (8C).

The third node is then excluded from the qualified hierarchical application tree at 1008. Note, for example, that download node 720 (820) is not included in (original) hierarchical application tree 750 (850) in FIG. 7B (8B). This is because the third node has stricter access rules (e.g., required per the new scope type) which are not reflected in the evaluated scopes of the original hierarchical application tree. In FIG. 7C and FIG. 8C, for example, the evaluated scopes of the original hierarchical application tree 750 and 850 do not include a silver or gold subscription and a corresponding end user should not be able to access processes which require a silver or gold subscription (e.g., the download process).

If the third node is not associated with the first scope type at the first value at step 1002 then the third node is excluded from the qualified hierarchical application tree at 1010. This example is not shown in FIGS. 7A-8C.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A system, comprising:
a communication interface coupled with a processor and configured to receive a first local scope definition associated with a first node in a hierarchical application tree and a second local scope definition associated with a second node in the hierarchical application tree, wherein the hierarchical application tree includes application instructions at one or more nodes within the hierarchical application tree; and
the processor configured to:
determine a pruned version of the hierarchical application tree, including by:
propagating the first local scope definition from the first node to the second node which is a child of the first node; and
pruning any nodes from the hierarchical application tree that are not relevant to a particular set of one or more local scope definitions at a given node in order to obtain the pruned version of the hierarchical application tree; and
generate a qualified application using those application instructions at the unpruned nodes in the pruned version of the hierarchical application tree, wherein:
generating the qualified application includes generating an application executable associated with a web-based application; and
the communication interface is further configured to send the application executable to a web browser on a device, wherein the web browser loads and performs the application executable.

2. The system recited in claim 1, wherein propagating the first local scope definition includes propagating a scope that is associated with one or more of the following: device type, user role, object scope, or plan level.

3. The system recited in claim 1, wherein:
propagating the first local scope definition includes propagating a scope that is associated with a device type having a value of mobile; and
pruning in order to obtain the pruned version of the hierarchical application tree includes pruning at least some graphics-related application instructions.

4. The system recited in claim 1, wherein the processor is further configured to: in the event a new type of local scope is encountered which has not been encountered before while traversing the hierarchical application tree, generate a cloned hierarchical application tree in addition to the pruned version of the hierarchical application tree.

5. The system recited in claim 1, wherein the processor is further configured to: in the event a new type of local scope is encountered which has not been encountered before while traversing the hierarchical application tree, generate a cloned hierarchical application tree in addition to the pruned version of the hierarchical application tree, wherein the cloned hierarchical application tree excludes those nodes that were encountered in the hierarchical application tree prior to the to new type of local scope.

6. A method, comprising:
receiving a first local scope definition associated with a first node in a hierarchical application tree and a second local scope definition associated with a second node in the hierarchical application tree, wherein the hierarchical application tree includes application instructions at one or more nodes within the hierarchical application tree;
determining a pruned version of the hierarchical application tree, including by:
propagating the first local scope definition from the first node to the second node which is a child of the first node; and
pruning any nodes from the hierarchical application tree that are not relevant to a particular set of one or more local scope definitions at a given node in order to obtain the pruned version of the hierarchical application tree; and
generating a qualified application using those application instructions at the unpruned nodes in the pruned version of the hierarchical application tree, wherein:
generating the qualified application includes generating an application executable associated with a web-based application; and
the method further includes sending the application executable to a web browser on a device, wherein the web browser loads and performs the application executable.

7. The method recited in claim 6, wherein propagating the first local scope definition includes propagating a scope that is associated with one or more of the following: device type, user role, object scope, or plan level.

8. The method recited in claim 6, wherein:
propagating the first local scope definition includes propagating a scope that is associated with a device type having a value of mobile; and
pruning in order to obtain the pruned version of the hierarchical application tree includes pruning at least some graphics-related application instructions.

9. The method recited in claim 6 further including: in the event a new type of local scope is encountered which has not been encountered before while traversing the hierarchical application tree, generating a cloned hierarchical application tree in addition to the pruned version of the hierarchical application tree.

10. The method recited in claim 6 further including: in the event a new type of local scope is encountered which has not been encountered before while traversing the hierarchical application tree, generating a cloned hierarchical application tree in addition to the pruned version of the hierarchical application tree, wherein the cloned hierarchical application tree excludes those is nodes that were encountered in the hierarchical application tree prior to the new type of local scope.

11. A computer program product, the computer program product being embodied in a non-transitory computer readable storage medium and comprising computer instructions for:
receiving a first local scope definition associated with a first node in a hierarchical application tree and a second local scope definition associated with a second node in the hierarchical application tree, wherein the hierarchical application tree includes application instructions at one or more nodes within the hierarchical application tree;
determining a pruned version of the hierarchical application tree, including by:
propagating the first local scope definition from the first node to the second node which is a child of the first node; and
pruning any nodes from the hierarchical application tree that are not relevant to a particular set of one or more local scope definitions at a given node in order to obtain the pruned version of the hierarchical application tree; and generating a qualified application using those application instructions at the unpruned nodes in the pruned version of the hierarchical application tree, wherein:

the computer instructions for generating the qualified application include computer instructions for generating an application executable associated with a web-based application; and the computer program product further includes computer instructions for sending the application executable to a web browser on a device, wherein the web browser loads and performs the application executable.

12. The computer program product recited in claim 11, wherein the computer instructions for propagating the first local scope definition include computer instructions for propagating a scope that is associated with one or more of the following: device type, user role, object scope, or plan level.

13. The computer program product recited in claim 11, wherein:

the computer instructions for propagating the first local scope definition include computer instructions for propagating a scope that is associated with a device type having a value of mobile; and the computer instructions for pruning in order to obtain the pruned version of the hierarchical application tree include computer instructions for pruning at least some graphics-related application instructions.

14. The computer program product recited in claim 11 further including computer instructions for: in the event a new type of local scope is encountered which has not been encountered before while traversing the hierarchical application tree, generating a cloned hierarchical application tree in addition to the pruned version of the hierarchical application tree.

15. The computer program product recited in claim 11 further including computer instructions for: in the event a new type of local scope is encountered which has not been encountered before while traversing the hierarchical application tree, generating a cloned hierarchical application tree in addition to the pruned version of the hierarchical application tree, wherein the cloned hierarchical application tree excludes those nodes that were encountered in the hierarchical application tree prior to the new type of local scope.

* * * * *